US010666469B2

(12) United States Patent
Bhattacharyya et al.

(10) Patent No.: US 10,666,469 B2
(45) Date of Patent: May 26, 2020

(54) PREDICTIVE DECISION FEEDBACK EQUALIZER

(71) Applicant: Maxlinear, Inc., Carlsbad, CA (US)

(72) Inventors: Prasun Kali Bhattacharyya, Bangalore (IN); Joseph Palackal Mathew, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 16/396,859

(22) Filed: Apr. 29, 2019

(65) Prior Publication Data

US 2019/0342129 A1 Nov. 7, 2019

Related U.S. Application Data

(60) Provisional application No. 62/686,700, filed on Jun. 19, 2018.

(30) Foreign Application Priority Data

May 2, 2018 (IN) .............................. 201811016619

(51) Int. Cl.
*H03K 5/159* (2006.01)
*H04L 25/03* (2006.01)

(52) U.S. Cl.
CPC .......... *H04L 25/03057* (2013.01); *H04L 2025/03496* (2013.01)

(58) Field of Classification Search
CPC ............... H04L 25/03057; H04L 2025/03496
USPC ....................................................... 375/233
See application file for complete search history.

(56) References Cited

U.S. PATENT DOCUMENTS

| | | | | |
|---|---|---|---|---|
| 2003/0189998 A1* | 10/2003 | Phanse | .............. | H04B 10/6971 375/348 |
| 2008/0080609 A1* | 4/2008 | Mobin | ................ | H04B 10/695 375/233 |
| 2012/0051418 A1* | 3/2012 | Yang | ................ | H04L 25/03057 375/233 |
| 2013/0243071 A1* | 9/2013 | Chmelar | .............. | H04L 25/063 375/233 |

\* cited by examiner

*Primary Examiner* — Don N Vo
(74) *Attorney, Agent, or Firm* — Maschoff Brennan; Jason W. Croft

(57) ABSTRACT

A digital signal processing circuit comprises a first equalizer circuit and a second equalizer circuit. An output of the second equalizer is used as feedback to generate an equalized signal. The output of the second equalizer circuit is based on a plurality of postcursor values and a plurality of precursor values, where the precursor values are generated based on an output of the first DFE circuit, and the postcursor values are generated independently of the output of the first DFE.

20 Claims, 3 Drawing Sheets

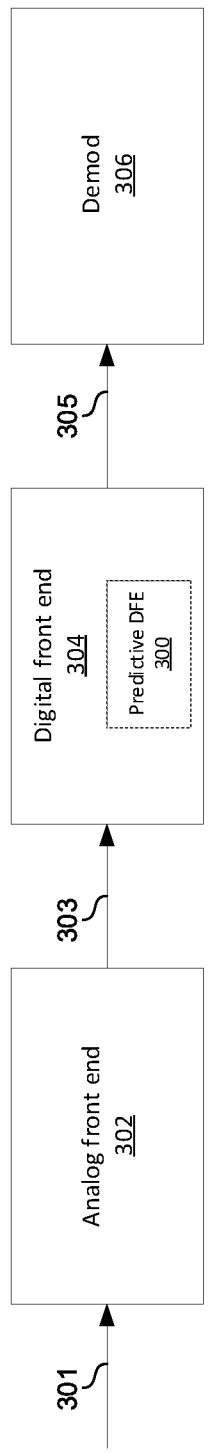

PREDICTIVE DECISION FEEDBACK EQUALIZER

PRIORITY CLAIM

This application claims priority to Indian provisional application 201811016619 filing May 2, 2018 and to U.S. provisional application 62/686,700 filed Jun. 19, 2018. Each of the above-mentioned documents is hereby incorporated herein by reference in its entirety.

BACKGROUND

Limitations and disadvantages of conventional approaches to signal processing will become apparent to one of skill in the art, through comparison of such systems with some aspects of the present invention as set forth in the remainder of the present application with reference to the drawings.

BRIEF SUMMARY OF THE INVENTION

A system and/or method is provided for a predictive decision feedback equalizer, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 shows a receiver comprising an instance of the predictive decision feedback equalizer of FIG. 1 or FIG. 2.

DETAILED DESCRIPTION OF THE INVENTION

Figure 1:
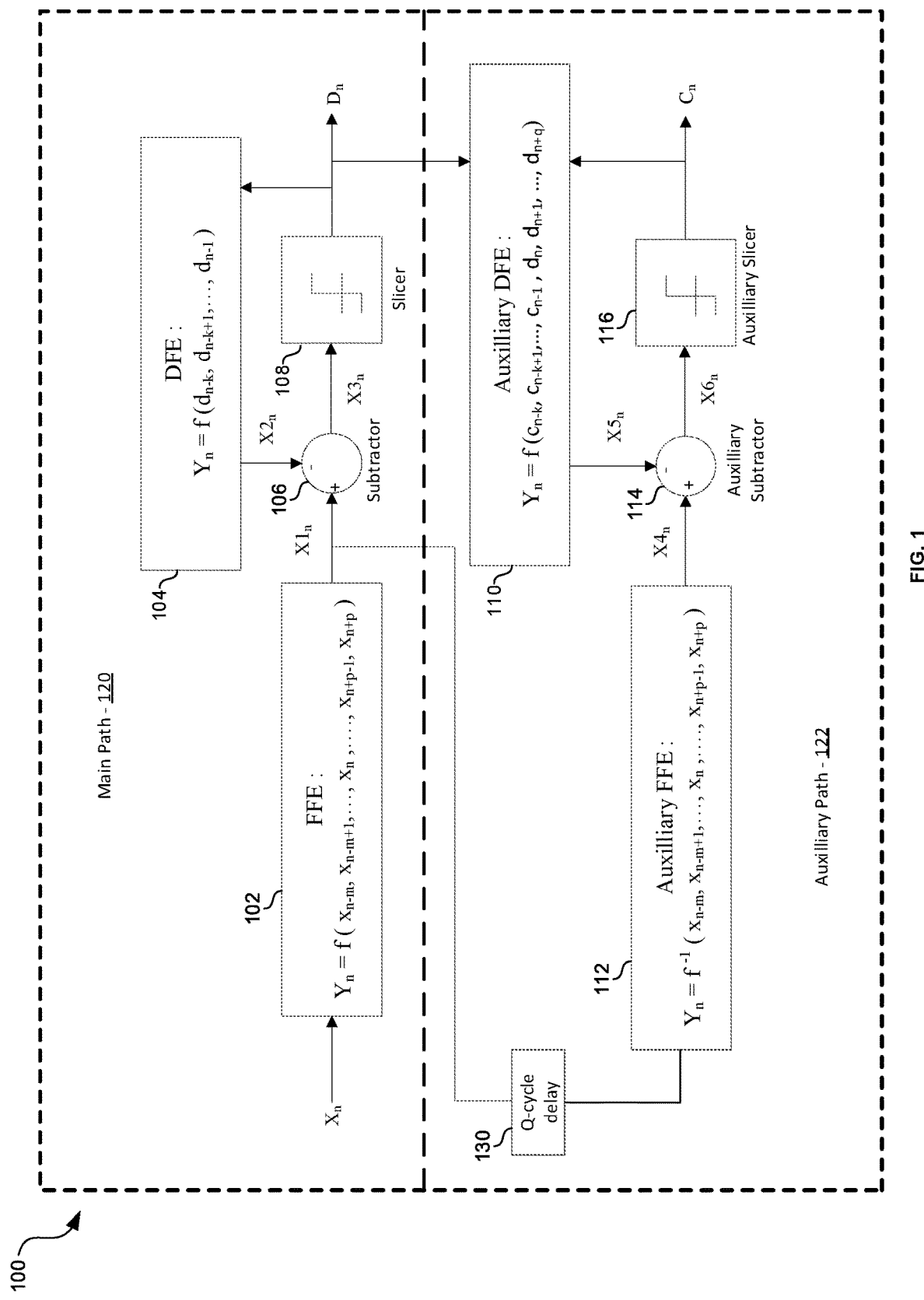
FIG. 1 shows a first example implementation of a predictive decision feedback equalizer.

FIG. 1 shows a first example implementation of a predictive decision feedback equalizer (DFE). The predictive DFE 100 comprises main path circuitry 120 and auxiliary path circuitry 122. The main path circuitry 120 comprises feed forward equalizer (FFE) circuitry 102, decision feedback equalizer (DFE) circuitry 104, a subtractor 106, and a slicer 108. The auxiliary path circuitry 122 comprises auxiliary FFE 112, auxiliary DFE 110, auxiliary subtractor 114, and auxiliary slicer 116.

The FFE 102 is operable to process input signal vector $X_n$ and generate output signal vector $X1_n$. The subtractor 106 is operable to generate output signal vector $X3_n = X1_n - X2_n$, where $X2_n$ is the DFE 104 output signal vector. The slicer 108 is operable to process $X3_n$ and generate the symbol vector $D_n$, which in turn feeds into the DFE 104 to generate $X2_n$ in feedback. The DFE 104 processes k past samples of $D_n$ ($d_{n-k}, d_{n-k+1}, \ldots, d_{n-1}$) and hence cannot correct any pre-cursor (n and k are integers). As FFE 102 processes past, present and future signal vectors, it can correct pre-cursors, but it boosts high-frequency noise already present in $X_n$. The auxiliary path 122 alleviates this problem.

The auxiliary FFE 112 is operable to implement an inverse function of the main-path FFE 102 while generating signal vector $X4_n$ from $X1_n$. The inverse function of the auxiliary FFE 112 is determined to nullify the boost in high-frequency noise given by the main-path FFE 102, improving signal-to-noise ratio (SNR) of $X4_n$ compared to $X1_n$. $X4_n$ is then passed through auxiliary subtractor 114 and auxiliary slicer 116 with auxiliary DFE 110 in feedback, to generate the final symbol vector $C_n$. The auxiliary DFE 110 gets its prospective future symbols ($d_{n+1}, \ldots, d_{n+q}$) from the output of the main-path slicer 108. The auxiliary path 122 comprises delay circuitry 130 that implements a delay of at least q-cycles (q is an integer) compared to the main-path 120 such that symbols $d_n$ through $d_{n+q}$ are available for processing in the auxiliary DFE 110 when generating $C_n$. The delay is shown at the input of auxiliary FFE 112 but may be implemented in the auxiliary path anywhere before the auxiliary subtractor 114.

The auxiliary subtractor 114 is operable to generate an output signal vector: $X6_n = X4_n - X5_n$, where $X5_n$ is the auxiliary DFE 110 output signal vector. The auxiliary slicer 116 is operable to process $X6_n$ and generate the final symbol vector $C_n$, which in turn feeds into the auxiliary DFE 110 to generate $X5_n$ in feedback. Since $X4_n$ has better SNR than $X1_n$, $X6_n$ has better SNR than $X3_n$. Consequently, bit error rate (BER) of the final symbol vector $C_n$ is better than BER of $D_n$.

Thus, the circuitry of FIG. 1 improves receiver bit error rate (BER). Alternatively, for the same BER, the circuitry of FIG. 1 can tolerate higher noise in $X_n$. Thus, the signal-to-noise ratio (SNR) requirement of receiver circuitry (e.g., analog front end 302 of FIG. 3) that generates $X_n$ is relaxed, which can be leveraged to reduce power-consumption and/or area of such circuitry.

Figure 2:
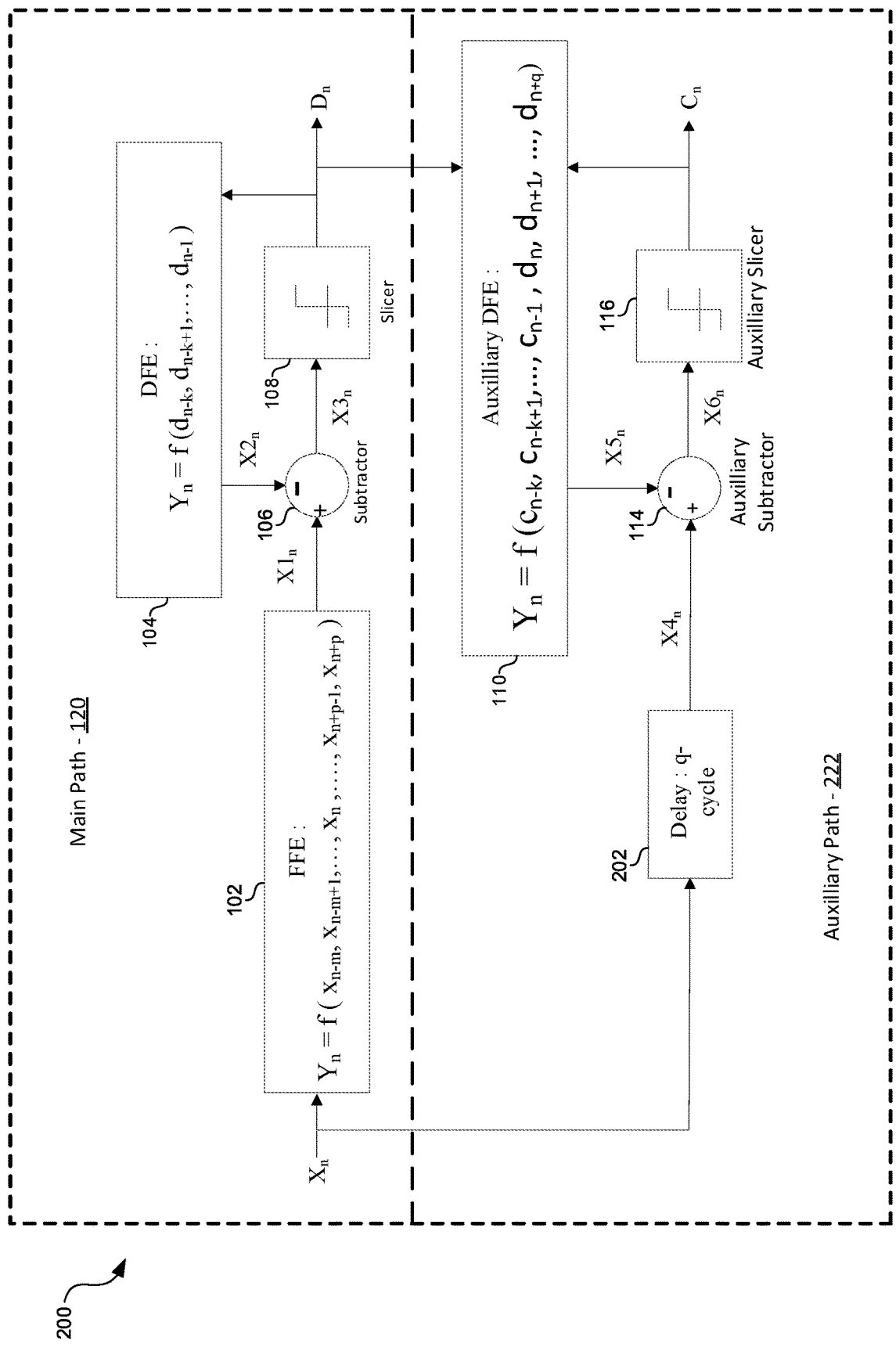
FIG. 2 shows a second example implementation of a predictive decision feedback equalizer.

FIG. 2 shows a second example implementation of a predictive decision feedback equalizer. The main path 120 of predictive DFE 200 is the same as the main path 120 of the DFE 100 of FIG. 1. The auxiliary path 222 of DFE 200 of FIG. 2 comprises delay circuitry 202 which receives $X_n$, instead of auxiliary FFE 112 receiving $X1_n$, as is the case in auxiliary path 122 of FIG. 1.

In the auxiliary path 222, $X_n$ is passed through delay circuitry 202 to generate $X4_n$, which is input to subtractor 114 along with $X5_n$ from auxiliary DFE 110. Subtractor 114 outputs $X6_n$ to slicer 116 with auxiliary DFE 110 in feedback to generate the final symbol vector $C_n$. The auxiliary DFE 110 gets its prospective future symbols ($d_{n+1}, \ldots, d_{n+q}$) from the slicer 108 output in the main-path. This is possible since the operations in the auxiliary path 222 is delayed by q-cycles using the delay circuitry 202 and hence the main-path symbol $d_{n+q}$ is available when the auxiliary path is calculating the symbol $c_n$.

The auxiliary subtractor 114 generates an output signal vector: $X6_n = X4_n - X5_n$, where $X5_n$ is the auxiliary DFE 110 output signal vector. The auxiliary slicer 116 works on $X6_n$ and generates the final symbol vector $C_n$, which in turn feeds into the auxiliary DFE 110 to generate $X5_n$ in feedback. As $X4_n$ is just a delayed version of $X_n$, it has better SNR than $X1_n$ and hence $X6_n$ has better SNR than $X3_n$. Consequently, BER of the final symbol vector $C_n$ is better than BER of $D_n$.

Thus, the circuitry of FIG. 2 improves receiver BER. Alternatively, for the same BER, the circuitry of FIG. 2 can tolerate higher noise in $X_n$. Thus, the SNR requirement of circuitry (e.g., analog front end 302 of FIG. 3) preceding the main-path FFE 102 is relaxed, which can be leveraged to reduce power consumption and/or area of such circuitry.

In another example implementation, the auxiliary path DFE 110 can get all its input from the output of the main-path slicer 108. In that case, the function realized by the DFE 110 can be represented by the following equation:

$$Y_n = f(d_{n-k}, d_{n-k+1}, \ldots, d_n, d_{n+1}, \ldots, d_{n+q})$$

Note: the notation "f( )" in this disclosure and the drawings is used generically to represent "is a function of." The functions realized by the various circuits may be completely independent of each other.

Aspects of this disclosure provide for correcting precursors without boosting noise generated by preceding circuits. Thus, achieving better SNR and BER compared to conventional circuits.

FIG. 3 shows a receiver comprising an instance of the predictive decision feedback equalizer of FIG. 1 or FIG. 2. The receiver comprises an analog front end 302, a digital front end 304, and a demodulator 306.

The analog front end 302 comprises circuitry operable to receive a signal over a channel (e.g., wired or wireless) and perform analog-domain processing of the signal such as amplification, filtering, and analog-to-digital conversion resulting in digital signal 303.

The digital front end 304 comprises circuitry operable to process the digital signal 303 to generate the digital signal 305. This circuitry includes an predictive DFE 300 which may be an instance of predictive DFE 100 of FIG. 1 or predictive DFE 200 of FIG. 2. In an example implementation, signal 303 is the signal $X_n$ of FIG. 1 or FIG. 2 and the signal 305 is the signal $C_n$ of FIG. 1 or FIG. 2.

The demodulator 306 comprises circuitry operable to process the signal 305 to recover information carried in the signal 305. This may include, for example, demodulation, decoding, etc.

In an example implementation of this disclosure a digital signal processing circuit (e.g., 100 or 200) comprises a first equalizer circuit (e.g., 104) and a second equalizer circuit (e.g., 110). An output (e.g., $X5_n$) of the second equalizer is used as feedback to generate an equalized signal (e.g., $C_n$). The output of the second equalizer circuit is based on a plurality of postcursor values (e.g., $C_{n-1}$ to $C_{n-k}$) and a plurality of precursor values (e.g., $d_n$ to $d_{n+q}$), where the precursor values are generated based on an output of the first DFE circuit, and the postcursor values are generated independently of the output of the first DFE. The digital signal processing circuit may comprise a first subtractor circuit (e.g., 106) and a first slicer circuit (e.g., 108), wherein the first subtractor outputs a first difference signal (e.g., $X3_n$) based on an output (e.g., $X2_n$) of the first equalizer circuit and a first signal (e.g., $X1_n$); the first slicer converts the first difference signal to a first binary value (e.g., $D_n$); the first binary value is used as a postcursor value in the first equalizer circuit; and the first binary value is one of the precursor values in the second equalizer circuit. The first signal may be an output of a third equalizer circuit (e.g., 102). The digital signal processing circuit may comprise a second subtractor circuit (e.g., 114) and a second slicer circuit (e.g., 116). The second subtractor circuit may output a second difference signal (e.g., $X6_n$) based on the output of the second equalizer circuit and a second signal (e.g., $X4_n$). The second slicer circuit may convert the second difference signal to a second binary value (e.g., $c_n$). The second binary value may be one of the postcursor values in the second equalizer circuit. The second signal may be an output of a third equalizer circuit (e.g., 112). The first signal may be an output of a third equalizer circuit (e.g., 102) and the second signal may be an output of a fourth equalizer circuit (e.g., 112). The fourth equalizer may realize a function that is the inverse of a function realized by the third equalizer. The second signal (e.g., $X4_n$) may be the result of equalization and delay of the first signal (e.g., $X1_n$). The first signal may be the result of an equalization of an input signal (e.g., $X_n$), and the second signal may be a delayed version of the input signal. The first equalizer circuit may be a decision feedback equalizer and the second equalizer circuit may be a decision feedback equalizer.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a digital signal processing circuit comprising a first equalizer circuit and a second equalizer circuit, wherein:
an output of the second equalizer circuit is used as feedback to generate an equalized signal;
the output of the second equalizer circuit is based on a plurality of postcursor values and a plurality of precursor values;
the precursor values are generated based on an output of the first equalizer circuit; and
the postcursor values are generated independently of the output of the first equalizer circuit.

2. The system of claim 1, comprising a first subtractor circuit and a first slicer circuit, wherein:
the first subtractor circuit outputs a first difference signal based on an output of the first equalizer circuit and a first signal;
the first slicer circuit converts the first difference signal to a first binary value;
the first binary value is used as a postcursor value in the first equalizer circuit; and
the first binary value is one of the precursor values in the second equalizer circuit.

3. The system of claim 2, wherein the first signal is an output of a third equalizer circuit.

4. The system of claim 2, comprising a second subtractor circuit and a second slicer circuit, wherein:
the second subtractor outputs a second difference signal based on the output of the second equalizer circuit and a second signal;
the second slicer converts the second difference signal to a second binary value; and
the second binary value is one of the postcursor values in the second equalizer circuit.

5. The system of claim 4, wherein the second signal is an output of a third equalizer circuit.

6. The system of claim 4, wherein the first signal is an output of a third equalizer circuit and the second signal is an output of a fourth equalizer circuit.

7. The system of claim 6, wherein the fourth equalizer circuit realizes a function that is the inverse of a function realized by the third equalizer.

8. The system of claim 4, wherein the second signal is a result of equalization and delay of the first signal.

9. The system of claim 4, wherein:
the first signal is a result of an equalization of an input signal; and
the second signal is a delayed version of the input signal.

10. The system of claim 1, wherein the first equalizer circuit is a decision feedback equalizer and the second equalizer circuit is a decision feedback equalizer.

11. A method comprising:
in a digital signal processing circuit comprising a first equalizer circuit and a second equalizer circuit:
generating an equalized signal based on feedback of an output of the second equalizer, wherein the output of the second equalizer circuit is based on a plurality of postcursor values and a plurality of precursor values;
generating the precursor values based on an output of the first equalizer circuit; and
generating the postcursor values independently of the output of the first equalizer circuit.

12. The method of claim 11, wherein the digital signal processing circuit comprises a first subtractor circuit and a first slicer circuit, and the method comprises:
outputting, by the first subtractor circuit, a first difference signal based on an output of the first equalizer circuit and a first signal;
converting, by the first slicer circuit, the first difference signal to a first binary value, wherein:
the first binary value is used as a postcursor value in the first equalizer circuit; and
the first binary value is one of the precursor values in the second equalizer circuit.

13. The method of claim 12, wherein the digital signal processing circuit comprises a third equalizer circuit and the method comprises the third equalizer circuit outputting the first signal.

14. The method of claim 12, wherein the digital signal processing circuit comprises a second subtractor circuit and a second slicer circuit, and the method comprises:
outputting, by the second subtractor circuit, a second difference signal based on the output of the second equalizer circuit and a second signal; and
converting, by the second slicer circuit, the second difference signal to a second binary value, wherein the second binary value is one of the postcursor values in the second equalizer circuit.

15. The method of claim 14, wherein the digital signal processing circuit comprises a third equalizer circuit and the method comprises the third equalizer circuit outputting the second signal.

16. The method of claim 14, wherein the digital signal processing circuit comprises a third equalizer circuit and a fourth equalizer circuit, and the method comprises:
the third equalizer circuit outputting the first signal; and
the fourth equalizer circuit outputting the second signal.

17. The method of claim 16, wherein the fourth equalizer circuit realizes a function that is the inverse of a function realized by the third equalizer circuit.

18. The method of claim 14, comprising equalizing and delaying, by the digital signal processing circuit, the first signal to generate the second signal.

19. The method of claim 14, comprising:
equalizing, by the digital signal processing circuit, an input signal to generate the first signal; and
delaying, by the digital signal processing circuit, the input signal to generate the second signal.

20. The method of claim 11, wherein the first equalizer circuit is a decision feedback equalizer and the second equalizer circuit is a decision feedback equalizer.

* * * * *